ial, the reference numeral 12 designates a rotary drum,
United States Patent Office 3,534,624
Patented Oct. 20, 1970

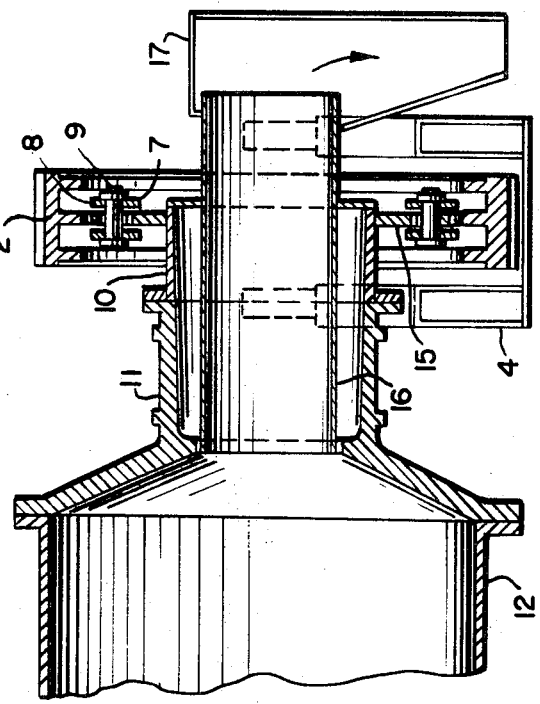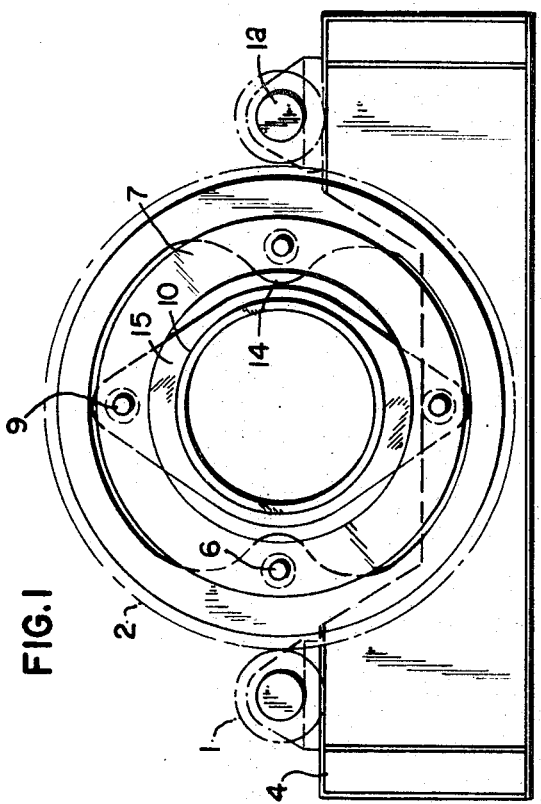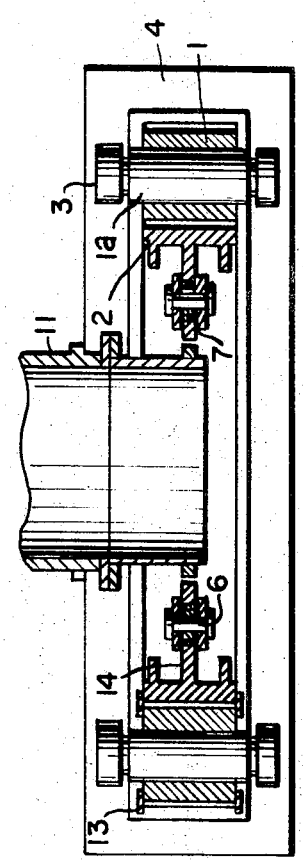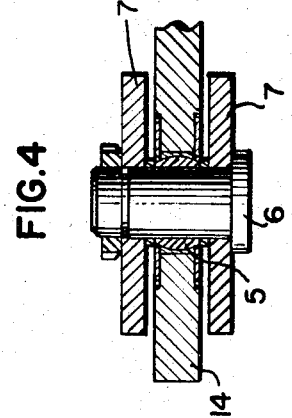

3,534,624
FLEXIBLE DRIVE MECHANISM FOR ROTARY DRUMS
Rene Durinck, Hellemmes, France, assignor to
Fives Lille-Cail, Paris, France
Filed Feb. 18, 1969, Ser. No. 800,234
Claims priority, application France, Feb. 19, 1968,
140,372
Int. Cl. F16h 57/00, 55/12
U.S. Cl. 74—410     5 Claims

ABSTRACT OF THE DISCLOSURE

A rotary drum such as that of a crusher, furnace, or the like, having a tubular mounting journal at one end thereof. The drive mechanism consists of a pinion driven ring gear, and universal joint means which connect the ring gear to the drum journal.

---

This invention relates to new and useful improvements in drive mechanisms for rotary drums such as those of crushers, furnaces, reactors, and the like, which drums are provided at their ends with tubular journals to mount the drums for rotation. In accordance with conventional practice the drive mechanism usually consists of a ring gear which is secured to the drum journal and meshes with one or more driving pinions secured to shafts which are journalled in bearings on a supporting frame. This conventional arrangement has the disadvantage of subjecting the teeth of the ring gear and pinions to rapid wear when the shafts of the pinions and the axis of rotation of the drum do not remain parallel as a result of bearing wear or weakening of the supporting structure.

It has been proposed to drive the drum by separate gearing mounted on a firm frame and coupled to the drum journal by a flexible drive connection. However, the drum journals are hollow to provide entrance and exit for materials and gases under treatment, and difficulties are experienced in feeding and removing such materials and gases through the hollow journals when the aforementioned flexible drive connection is present.

It also has been proposed to drive the drum by a gear case mounted on the drum journal itself, while drive to the gear case is transmitted through a flexible coupling from a rigidly mounted prime mover. This arrangement, however, is complicated and expensive.

It is, therefore the principal object of this invention to eliminate the above outlined disadvantages of conventional drive mechanisms, this being attained by the provision of a flexible drive wherein a ring gear is connected to the drum journal by universal joint means and meshes with a driving pinion on a shaft which is journalled in bearings on the supporting structure, the universal joint means facilitating proper meshing of the driving pinion and ring gear even when under some conditions the pinion shaft is not parallel to the axis of rotation of the drum and ring gear, in which event the universal joint means permits the axis of the ring gear to be parallel to the pinion shaft while the axis of rotation of the drum is not.

The drive mechanism of the invention is simple in construction, efficient in operation, and lends itself to economical manufacture and use in connection with rotary drums of the various aforementioned types.

With the foregoing more important object and features in view and such other objects and features as may become apparent as this specification proceeds, the invention will be understood from the following description taken in conjunction with the accompanying drawing, wherein like characters of reference are used to designate like parts and in which:

FIG. 1 is an end elevational view showing a rotary drum with the drive mechanism of the invention;
FIG. 2 is a fragmentary vertical sectional view thereof;
FIG. 3 is a fragmentary horizontal sectional view; and
FIG. 4 is an enlarged fragmentary detail of one of the joints of the universal joint means.

Referring now to the accompanying drawings in detail, the reference numeral 12 designates a rotary drum, such as that of a crusher, furnace, reactor, or the like, the drum being horizontally disposed and provided at its ends with journals, one of which is shown at 11, whereby the drum is rotatably mounted, it being understood that the journals 11 are disposed in suitable bearings (not shown), in the conventional manner.

The drive mechanism for the drum 12 comprises a ring gear 2 which is substantially coaxial with the axis of rotation of the drum and meshes with one or more drive pinions 1. If two such pinions are used, they are disposed at diametrically opposite sides of the ring gear 2 as shown, although it will be understood that only one such pinion or more than two such pinions may be used, if so desired. The pinions 1 are secured to drive axles 1a journalled in suitable bearings 3 on a supporting frame 4.

The ring gear 2 surrounds a tubular extension 10 which is rigidly secured to the drum journal 11 and the essence of the invention resides in providing universal joint means for connecting the ring gear to the journal extension 10, so that under certain operating conditions hereafter mentioned, the axis of rotation of the ring gear 2 may remain parallel to the pinion axles 1a for proper meshing of the ring gear with the pinions 1, while the axis of rotation of the drum 12 is not necessarily so parallel.

The aforesaid universal joint means comprises a pair of diametrically opposite attachment webs 14 which are provided integrally inside the ring gear 2 and are sandwiched with some axial clearance between a pair of annular floating plates 7. The webs 14 are equipped with a pair of ball-and-socket type swivel joints 5, and pins 6 extend through the two plates 7 and through the joints 5 as is best shown in FIG. 4, so that the joints permit a limited amount of angular movement of the plates 7 relative to the webs 14 in the plane of the axis of the pins 6.

The universal joint means also include a drive member 15 which is secured to the drum journal extension 10 and has tapered end portions sandwiched between the two floating plates 7, to which the tapered end portions of the member 15 are connected by ball-and-socket type swivel joints 8 and pins 9, in the same manner as the joints 5 and pins 6, already described. It is to be noted that while the joints 5–6 and 8–9 in each set are diametrically opposite, that is, located at diametrically opposite sides of the journal extension 10, a diametric line connecting the joints 5–6 is perpendicular to, or angularly offset by 90° from a diametric line connecting the joints 8–9. Accordingly, the two pairs of joints 5–6 and 8–9, coacting with their associated components 7, 14 and 15, constitute universal joint means between the ring gear 2 and the drum journal extension 10 whereby the ring gear need not be always coaxial with the axis of rotation of the drum 12.

Thus, when the apparatus is in operation and for some reason such as bearing wear or weakening of supporting structure, the axis of rotation of the drum 12 comes out of alignment with the axis of rotation of the ring gear 2, the ring gear may continue to rotate about its proper axis which is parallel to the axles 1a of the pinions 1, so that proper meshing of the pinions with the ring gear continues and undue wearing of gear teeth is prevented.

Inasmuch as the universal joint mounting of the ring gear 2 on the drum journal extension 10 permits angular movement of the ring gear relative to the axis of the drum, and vice versa, it is desirable to provide guide means for the ring gear in order to restrain the same to the plane of rotation of the ring gear and the pinions 1.

Such guide means are obtained by providing one of the pinions 1 at its opposite sides with a pair of flanges 13 which project radially outwardly beyond the teeth of the pinion and overlap the teeth of the ring gear 2, as will be apparent from the left-hand portion of FIG. 3. Conversely, such guiding flanges may be provided at opposite sides of the ring gear to overlap the teeth of the pinions, as will be readily understood. In either event, the guide means serve to retain the ring gear and the pinions in coplanar relation, notwithstanding any deviation of the axis of rotation of the drum 12 from the axis of rotation of the ring gear.

In accordance with conventional practice, a tubular conduit 16 may extend through the journal 11 and journal extension 10 for delivery of material under treatment from the drum 12 into a suitable receptacle 17.

What is claimed as new is:

1. A rotary drum provided at one end thereof with a tubular journal mounting the drum for rotation, and a universally flexible drive mechanism for said drum, said mechanism comprising at least one drive pinion rotatably mounted on a supporting frame at one side of the axis of rotation of the drum, a ring gear concentric with said journal and meshing with said drive pinion, and universal joint means connecting said ring gear to said journal.

2. The device as defined in claim 1 wherein said universal joint means comprise an annular floating plate and pairs of swivel joints provided at diametrically opposite points on said floating plate with one set of said joints being angularly offset by 90° from the other set of joints, one set of said joints connecting said plate to said ring gear and the other set of joints connecting said plate to said journal of the drum.

3. The device as defined in claim 2 wherein said universal joint means also include a drive member secured to said journal, said other set of said joints connecting said floating plate to said drive member.

4. The device as defined in claim 1 together with means for restraining said ring gear against displacement from the plane of rotation of said pinion.

5. The device as defined in claim 4 wherein said restraining means comprise flanges provided at opposite sides of said pinion and overlapping said ring gear.

References Cited

UNITED STATES PATENTS

| | | | |
|---|---|---|---|
| 2,547,877 | 4/1951 | Lucia | 74—410 X |
| 3,434,365 | 3/1969 | Quenneville | 74—410 |
| 3,456,518 | 7/1969 | Toupouzian | 74—410 X |
| 3,477,316 | 11/1969 | Wildhaber | 74—410 X |

LEONARD H. GERIN, Primary Examiner

U.S. Cl. X.R.

74—446